May 4, 1926.
C. J. COBERLY
1,583,575
GAUGE
Filed May 16, 1921
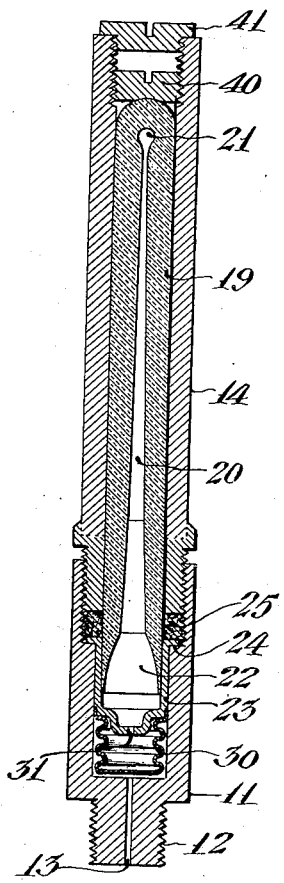
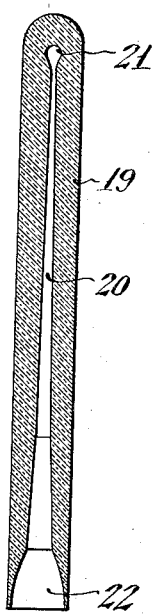
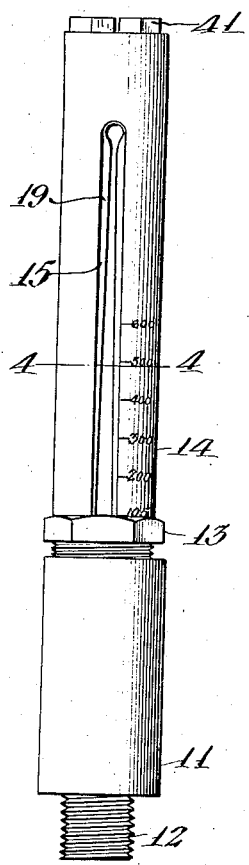
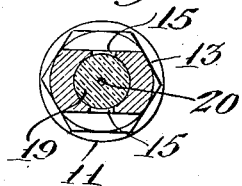
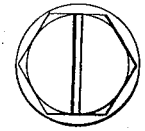
Inventor
Clarence J. Coberly
by Graham + Harri
Attorneys Patented May 4, 1926.

1,583,575

UNITED STATES PATENT OFFICE.

CLARENCE J. COBERLY, OF WALNUT PARK, CALIFORNIA, ASSIGNOR TO PUROX COMPANY, OF DENVER, COLORADO, A CORPORATION OF COLORADO.

GAUGE.

Application filed May 16, 1921. Serial No. 470,147.

*To all whom it may concern:*

Be it known that I, CLARENCE J. COBERLY, a citizen of the United States, residing at Walnut Park, in the county of Los Angeles and State of California, have invented a new and useful Gauge, of which the following is a specification.

My invention relates to gauges used for indicating the amount of gas in oxygen, hydrogen and acetylene or other gas cylinders and for similar purposes. Oxygen, hydrogen, acetylene, ammonia, carbon dioxide, chlorine, nitrous oxide, helium, nitrogen and other gases are at the present time sold in cylinders in which these gases are carried under a very high compression. Such gases are used for many purposes including use with welding and cutting torches. In most cases, it is highly desirable for the user to have some sort of a gauge to indicate the amount of gas in the cylinder, both for the purpose of manipulating the torches and regulating devices sold therewith, and also for the purpose of enabling him to determine the quantities of these gases used for a particular purpose and the amount of gas available in the cylinder at a given time.

In the ordinary utilization of these gases, it is common practice to provide pressure gauges of conventional form in which the pressure of the gauge acts upon diaphragms or bent tubes against the natural elasticity of the diaphragm tube or against a spring. These gauges are commonly calibrated to show the cubic feet of gas in the cylinder. I have found that gauges which depend entirely upon pressure give faulty indications for many reasons. In the first place, the quantity of gas at a given pressure varies with the temperature and it is necessary to make temperature corrections if the amount of gas is to be determined with any degree of accuracy. The amount of this variation due to temperature change is different with different gases and with the same gas at different pressures. At the pressures usually employed most gases deviate from Boyle's law to a very appreciable extent; some gases such as carbon dioxide and others being partly in the liquid state when the containers are completely filled. Hence the assumption that the amount of gas in the cylinder is proportional to the pressure introduces errors too large to be tolerated in most commercial work. Secondly, some gases such, for example, as acetylene are ordinarily sold in a dissolved form, acetone being used to dissolve acetylene. Such gases are compressed to a higher degree in a cylinder in which the dissolving liquid is present, the gases going into solution in the dissolving agent so that the pressure is not a direct function of the amount of gas in the cylinder. My invention obviates these and other difficulties.

Further objects and advantages will be made evident hereinafter.

Referring to the drawing which is for illustrative purposes only,

Fig. 1 is an elevation of one embodiment of my invention.

Fig. 2 is a cross section through the glass tube used in this embodiment of my invention.

Fig. 3 is a cross section through the pressure gauge.

Fig. 4 is a cross section on a plane represented by the line 4—4 of Fig. 1.

Fig. 5 is a view of the gauge as seen from above.

In the embodiment of my invention shown, I provide a socket 11 which is provided with a screw thread 12 by means of which it may be attached to the gas cylinder or to piping connected therewith. A small passage 13 connects the interior of the socket 11 with the interior of the cylinder. Threaded in the top of the socket 11 is a shell 14 which is cut away at either side as shown at Fig. 4, narrow slots 15 being thus provided through which a glass member 19 may be seen. The glass member 19 is provided with a central bore 20, an upper cavity 21 and an enlarged throat 22. The throat 22 extends down inside a thimble 23 which is inside the cavity of the socket 11 and which is held in place therein by shoulders 24 which are held down by packing 25 which is compressed by screwing down shell 14. Secured inside the cavity of the socket 11 and welded or otherwise secured to the thimble 23 is a flexible diaphragm 30. This diaphragm is in the form of a light sheet metal member provided with corrugations and forming a tight chamber which communicates with the interior of the thimble 23 through a small opening 31. The tube 19 is held in place in the shell 14 by a plug 40, the upper end of this tube being closed by a cap 41.

My invention consists in providing a means which will automatically apply corrections for any one gas and which can be used for other gases by simple substitutions. This is accomplished by using the same gas or gas and liquid combination in the tube of the gauge as is used in the cylinder. As long as the temperature of the gauge is approximately the same as the cylinder, the same corrections apply to both and hence the effect of these variations is entirely eliminated.

Acetone is used as the confining liquid in the case of acetylene, and water, oil or mercury is used in the case of the other gases, depending upon the characteristics of the gas in question.

The operation of my invention can be well understood if described as applied to an acetylene cylinder. This cylinder contains acetone wherein acetylene under pressure is dissolved. The lower portion of the tube 19 as well as the interior of the thimble 23 and the diaphragm 30 are filled with acetone which is highly colored so that it can be readily seen through the thick walls of the glass tube 19. The space inside the bore 20 above the acetone and the space 21 is filled with acetylene. The gauge being attached to the receptacle in which it is desired to measure the amount of acetylene, the pressure thereof is exerted through the hole 13 on the diaphragm 30. This diaphragm is sufficiently flexible so that it yields readily to this pressure, thus transmitting the pressure to the acetone which is practically incompressible and through the acetone to the acetylene which is compressible. At any pressure a certain amount of acetylene will be dissolved in the acetone and as the pressure increases, increasing quantities of acetylene will be so dissolved. It will be evident, however, that the conditions in the container and the conditions in the gauge will be identical, that is to say, they will be at approximately the same temperature and the pressure will act upon the acetylene in the gauge in so far as the percentage dissolved is concerned in exactly the same manner as it acts upon the acetylene in the container. It is, therefore, possible to calibrate the gauge so that its graduations will show accurately the units of volume of acetylene in the tank or container under the conditions of pressure and temperature of said tank or container. This is determined by looking through the openings 15 at the upper surface of the colored body of the acetone. It will be readily appreciated that the gauge is to be calibrated for each size of gas container.

In the drawings the bore 20 is shown of irregular outline for the purpose of allowing the calibration markings to be more evenly spaced. It will be readily understood, however, that the shape of the bore may be varied if desired.

I claim as my invention:

1. A gauge for acetylene tanks comprising a transparent tube closed at its upper end; a body of acetone in the lower end of said tube; a body of acetylene above said acetone in said tube; and means by which the pressure of the acetylene in the tank acts upon said acetylene through said acetone.

2. A gauge for acetylene tanks comprising a transparent tube closed at its upper end; a body of acetone in the lower end of said tube; a body of acetylene above said acetone in said tube; a flexible metallic cap closing the bottom of said tube; and means for so supporting said cap that the pressure of the acetylene in said tank is exerted on same.

3. A gauge for indicating the amount of gas contained in an enclosed space which contains a liquid in which said gas is soluble comprising: a tube; a body of said liquid in said tube, the remainder of said tube being filled with said gas; and means cooperating with said tube for isolating said body of liquid from said enclosed space in such a manner that said body of liquid is subjected to the same conditions of temperature and pressure as said space, said tube being so calibrated that the level of said body of said liquid therein indicates the amount of said gas in said space under the conditions of pressure and temperature of said space.

4. A gauge for indicating the amount of gas contained in an enclosed space which contains a liquid in which said gas is soluble comprising: a container; a body of said liquid in said container, the remainder of said container being filled with said gas; and means cooperating with said container for isolating said body of liquid from said enclosed space in such a manner that said body of liquid is subjected to substantially the same conditions of temperature and pressure as said space, said container being so calibrated that the level of said body of liquid therein indicates the amount of gas in said space under the conditions of pressure and temperature of said space.

5. A gauge for indicating the amount of a gas contained in an enclosed space which contains a liquid in which said gas is soluble comprising; a transparent tube; a body of said liquid in said tube, the remainder of said tube being filled with said gas; a flexible diaphragm closing the lower end of said tube, said diaphragm being adapted to be subjected to the pressure inside said enclosed space, there being calibration markings on said tube indicating the amount of said gas in said space under the conditions of temperature and pressure of said space, the level of said liquid in said tube being comparable with said calibration markings to effect a reading.

In testimony whereof, I have hereunto set my hand at Los Angeles, California, this 11th day of May, 1921.

CLARENCE J. COBERLY.